Jan. 15, 1952   J. G. PETERSON   2,582,651
DUAL VISION REAR VIEW MIRROR
Filed March 21, 1950
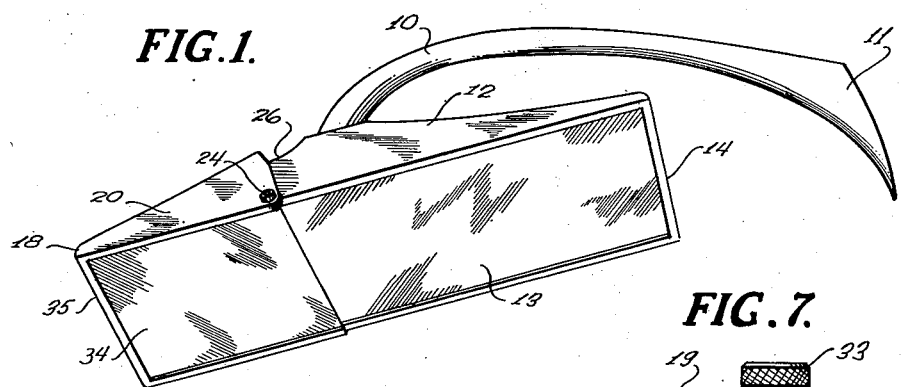
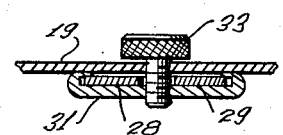
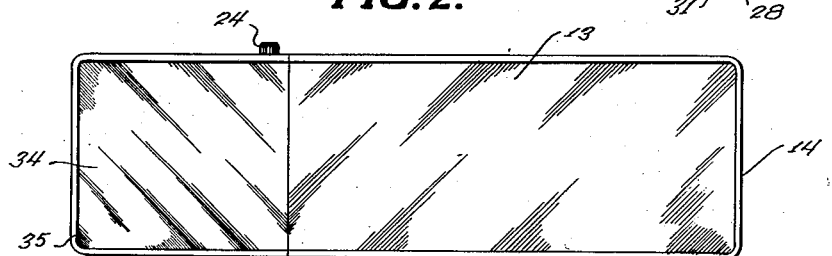
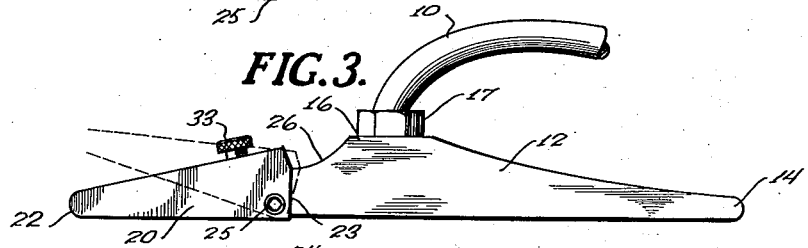
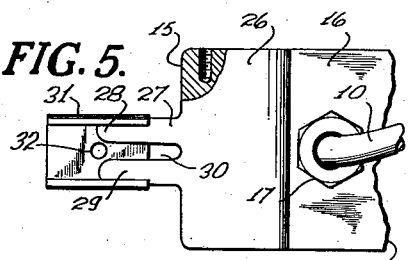
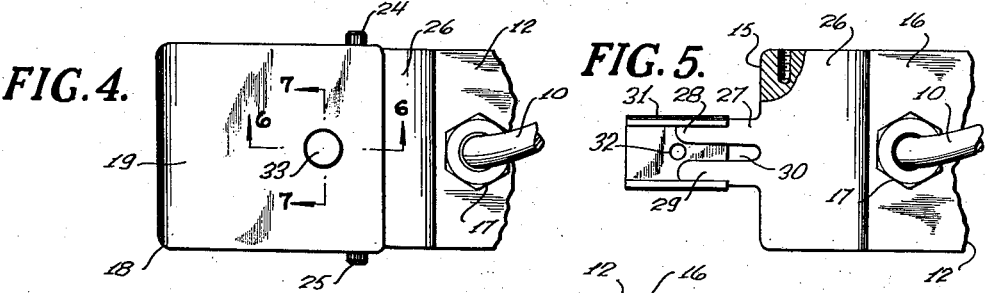
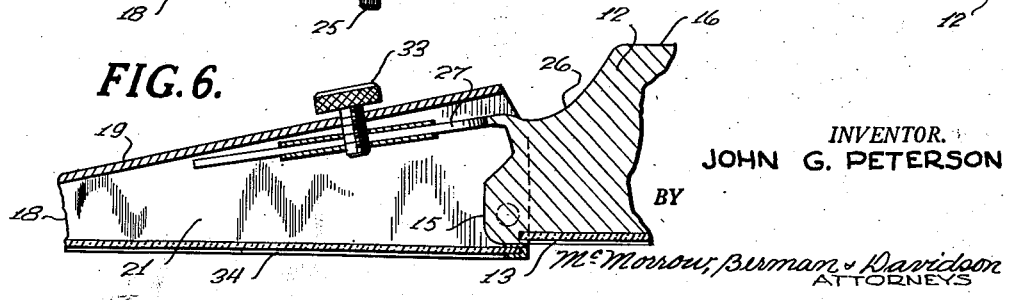
INVENTOR.
JOHN G. PETERSON
BY
McMorrow, Berman & Davidson
ATTORNEYS Patented Jan. 15, 1952

2,582,651

UNITED STATES PATENT OFFICE 2,582,651

DUAL VISION REAR VIEW MIRROR

John G. Peterson, Bridgeport, Conn.

Application March 21, 1950, Serial No. 150,879

2 Claims. (Cl. 88—87)

This invention relates to rear view mirrors for automotive vehicles and more particularly to a dual vision rear view mirror having an adjustable portion to vary or increase the field of vision reflected by the mirror to the operator of a vehicle on which the mirror is mounted or to cover two distinct fields of vision.

It is among the objects of the invention to provide a rear view mirror and an adjustable mounting therefor so that the mirror can be adjusted as an entirety to cover a desired field of vision or two related fields of vision and which includes at least two mirror portions or sections which are adjustably movable relative to each other to vary or increase the field of vision covered by the mirror and eliminate blind areas, which includes means for rigidly securing the two mirror sections in adjusted position relative to each other, and which is simple and durable in construction, economical to manufacture, and neat and attractive in appearance.

Other objects and advantages will become apparent from a consideration of the following description and the appended claims in conjunction with the accompanying drawing, wherein:

Figure 1 is a perspective view of a rear view mirror assembly illustrative of the invention;

Figure 2 is a front elevational view of the mirror assembly illustrated in Figure 1;

Figure 3 is a side or edge elevational view of the mirror assembly illustrated in Figures 1 and 2;

Figure 4 is a rear elevational view of a fragmentary portion of the mirror assembly;

Figure 5 is a rear elevational view similar to Figure 4, but with one of the components of the assembly illustrated in Figure 4 omitted;

Figure 6 is a cross sectional view on an enlarged scale on the line 6—6 of Figure 4; and Figure 7 is a cross sectional view on an enlarged scale on the line 7—7 of Figure 4.

With continued reference to the drawing, the mirror assembly comprises an elongated, curved support arm 10 one end of which, as indicated at 11, is attachable to some part of an automotive vehicle, such as a door hinge, cowl or windshield support and the other end of which is provided with a ball formation, not illustrated. A backing block 12 is provided with a flat face of elongated, rectangular shape and a mirror section 13 is mounted on this face of the backing block. The backing block tapers in thickness from one end thereof, as indicated at 14, toward the other end having its maximum thickness between its two ends but nearer the end 15 than the end 14. At its location of maximum thickness the backing block is provided with a rear face 16 which is substantially parallel to the front face of the block on which the mirror section 13 is mounted and the block is recessed within the rear face 16 to provide a partly spherical socket which receives the ball formation on the corresponding end of the support arm 10. A gland nut 17 threaded into the socket holds the ball in the socket and locks the backing block 12 at various desired positions of adjustment relative to the support arm 10.

A hollow bracket 18, preferably formed of sheet metal, has a rectangular back wall 19 and two side walls or flanges 20 and 21 which extend one along each side edge of the rear wall 19 and are disposed substantially perpendicular to the rear wall and parallel to each other. These flanges 20 and 21 are tapered in width from one end 22 of the bracket to the opposite end 23 and are provided near their corners at their wider ends and remote from the back wall with registering apertures.

The side flanges of the bracket are spaced apart to receive the end 15 of the backing block therebetween and the bracket is pivotally secured to this end of the backing block by screws 24 and 25 which extend through the apertures in the side flanges of the bracket and are threaded through tapped holes provided in the opposite side surfaces of the backing block. Between the rear wall surface 16 and the end 15 the backing block 12 is concavely recessed, as indicated at 26, to provide freedom of turning movement of the bracket 18 relative to the backing block and a flat, bifurcated tongue 27 extends from the recessed side of the backing block outwardly of the backing block and along the inner side of the back wall 19 of the bracket.

The bifurcated tongue 27 comprises two spaced apart, substantially parallel tines 28 and 29 with a slot 30 extending longitudinally therebetween. A laterally flanged clamp plate 31 of elongated, rectangular shape is slidably mounted on the tongue 27 with its flanges slidably engaging the outer edges of the tongues 28 and 29 and this plate is provided at its center with a tapped hole 32. The plate 31 is disposed at the side of the tongue 27 opposite the back wall 19 of the bracket and a thumbscrew 33 is extended through an aperture in the back wall 19 and threaded into the tapped hole 32 to clamp the plate 31, the tongue 27 and the back wall of the bracket together to rigidly secure the bracket at different angular positions relative to the backing block 26.

A mirror section 34 of rectangular shape and of the same width as the mirror section 13 is secured between the edges of the bracket flanges 20 and 21 remote from the back wall 19 and faces in the same general direction as the mirror section 13.

Within this arrangement the bracket can be angularly adjusted relative to the backing block 12 until a desired angle is provided between the two mirror sections 34 and 13 and the bracket and mirror section 34 may then be securely clamped in adjusted position relative to the backing block and mirror section 13 by tightening the thumbscrew 33.

The mirror section 34 has a length such that the outer end of itself and of the bracket 18, as indicated at 35, is substantially the same distance from the ball receiving socket in the backing block as the outer end 14 of the backing block so that the entire mirror assembly is symmetrical relative to its mounting on the support arm 10.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A rear view mirror assembly comprising a support, a backing block adjustably mounted on one end of said support, a mirror section mounted on said backing block, a bracket pivotally secured at one end to said backing block at one end of the latter for movement about an axis substantially parallel to said mirror section, a second mirror section mounted on said bracket and facing in the same general direction as the first mentioned mirror section, a tongue extending from said one end of said backing block along said bracket and having a longitudinally extending slot therein, a clamp plate slidable along said tongue and having a tapped hole therein, and a screw carried by said bracket and extending through the slot in said tongue and engaged in the tapped hole in said clamp plate to clamp said clamp plate, said tongue and said bracket together with said second mirror section in a desired position of adjustment relative to said first mentioned mirror section.

2. A rear view mirror assembly comprising a support, a backing block adjustably mounted at one side on said support and having a flat face on its opposite side, a mirror section mounted on the flat face of said block, a mirror carrying bracket pivotally mounted at one end on said backing block at one end of the latter, a mirror section carried by said bracket, and means connected between said backing block and said bracket for securing the two mirror sections in selected positions of angular adjustment relative to each other, said bracket having a back wall spaced from the bracket carried mirror section, and said means comprising a bifurcated tongue projecting from said one end of said backing block along the inner surface of the back wall of said bracket, a laterally flanged clamp plate slidable along said tongue and having a tapped hole therein, and a thumbscrew extending through an aperture in said back wall and between the two parts of said bifurcated tongue and threaded into the tapped hole in said clamp plate to clamp said clamp plate, said tongue and said bracket together.

JOHN G. PETERSON.

REFERENCES CITED

The following references are of record in the file of this patent:

UNITED STATES PATENTS

| Number | Name | Date |
|---|---|---|
| 1,416,966 | Morris | May 23, 1922 |
| 1,525,114 | Yoscary | Feb. 3, 1925 |
| 1,892,860 | Wehr et al. | Jan. 3, 1933 |
| 1,895,560 | Weir | Jan. 31, 1933 |